(12) United States Patent
Wang et al.

(10) Patent No.: US 12,447,535 B2
(45) Date of Patent: Oct. 21, 2025

(54) COATED CUTTING TOOL AND PREPARATION METHOD THEREOF

(71) Applicant: Guangdong University of Technology, Guangzhou (CN)

(72) Inventors: Chengyong Wang, Guangzhou (CN); Haisheng Lin, Guangzhou (CN); Lijuan Zheng, Guangzhou (CN); Tongchun Kuang, Guangzhou (CN); Yang Deng, Guangzhou (CN); Qimin Wang, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 625 days.

(21) Appl. No.: 17/721,386

(22) Filed: Apr. 15, 2022

(65) Prior Publication Data

US 2022/0234114 A1  Jul. 28, 2022

Related U.S. Application Data

(63) Continuation-in-part of application No. PCT/CN2019/111204, filed on Oct. 15, 2019.

(51) Int. Cl.
| | | |
|---|---|---|
| *B23B 27/14* | (2006.01) | |
| *C23C 14/02* | (2006.01) | |
| *C23C 14/06* | (2006.01) | |
| *C23C 14/35* | (2006.01) | |

(52) U.S. Cl.
CPC .......... *B23B 27/148* (2013.01); *C23C 14/021* (2013.01); *C23C 14/0647* (2013.01); *C23C 14/35* (2013.01); *B23B 2228/105* (2013.01)

(58) Field of Classification Search
None
See application file for complete search history.

(56) References Cited

U.S. PATENT DOCUMENTS 3,916,075 A * 10/1975 Dimigen ............. C23C 14/0641
                                                         252/512

FOREIGN PATENT DOCUMENTS

| CN | 106191771 A | * | 12/2016 | ......... C23C 14/0641 |
| CN | 107151787 A | * | 9/2017 | ........... C23C 14/352 |
| JP | 59080775 A | * | 5/1984 | |

OTHER PUBLICATIONS

Jayaraman et al. "HfB2 and Hf-B-N hard coatings by chemical vapor deposition," Surface & Coatings Technology 200 (2006) 6629-6633 (Year: 2006).*

* cited by examiner

*Primary Examiner* — David Sample
(74) *Attorney, Agent, or Firm* — MATTHIAS SCHOLL P.C.; Matthias Scholl

(57) ABSTRACT

A cutting tool for machining titanium alloy or superalloy includes a Me-B-N coating. The Me-B-N coating is Me1-B-N; Me1 is one or more selected from transition metal elements Hf, V, Nb, Ta and Mo, and the atomic percentage of each element is: Me1: 8-40%, B: 15-60%, and N: 10-65%; and the Me-B-N coating includes Me1Nx phase and BN phase; or, the Me-B-N coating is Me1-Me2-B-N, Me1 is one or more selected from transition metal elements Hf, V, Nb, Ta and Mo; Me2 is one or more selected from transition metal elements Ti, Zr, Cr, and W; and the atomic percentage of each element is: Me1: 4-36%, Me2: 4-36%, B: 15-60%, and N: 10-65%; and the Me-B-N coating includes Me1Nx phase, Me2Nx phase and BN phase.

2 Claims, 1 Drawing Sheet

COATED CUTTING TOOL AND PREPARATION METHOD THEREOF

CROSS-REFERENCE TO RELATED APPLICATIONS

Figure 1:
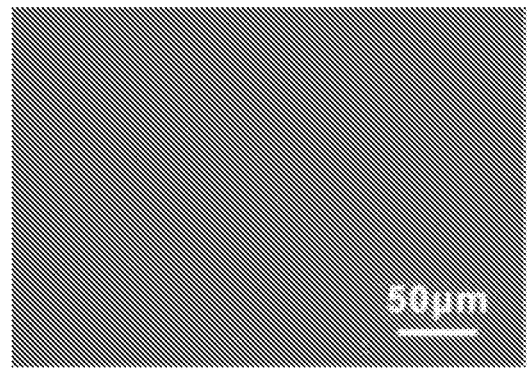

This application is a continuation-in-part of International Patent Application No. PCT/CN2019/111204 with an international filing date of Oct. 15, 2019, designating the United States, now pending, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to the field of protective coating for cutting tools for difficult machining materials, and more particularly to a coated tool for machining titanium alloy or superalloy and a preparation method thereof In the field of machining, titanium alloy or superalloy are difficult to process. During processing, titanium alloy or superalloy are easy to stick to the cutting tool, resulting in serious bonding wear of the tool and reducing the service life of the tool.

Cemented carbide cutting tools have become a good choice for processing titanium alloy or superalloy because of their low cost and excellent machining performance. The coating materials commonly used in cemented carbide coated tools are nitrogen/carbide coatings of transition metals, such as TiAlN, TiSiCN, AlCrSiN, etc.

TM-B and Tm-B-N coatings have also been reported, such as $TiB_2$, $VB_2$, TiBN, etc. TM-B coating has the problems of high stress and poor adhesion, which seriously restricts its application in machining.

SUMMARY

The disclosure provides a cu tool comprising a Me-B-N coating.

In a class of this embodiment, the Me-B-N coating is Me1-B-N; Me1 is one or more selected from transition metal elements Hf, V, Nb, Ta and Mo, and an atomic percentage of each element is: Me1: 8-40%, B: 15-60%, and N: 10-65%; and the Me-B-N coating comprises Me1Nx phase and BN phase.

In a class of this embodiment, the Me-B-N coating is Me1-Me2-B-N, Me1 is one or more selected from transition metal elements Hf, V, Nb, Ta and Mo; Me2 is one or more selected from transition metal elements Ti, Zr, Cr, and W; and an atomic percentage of each element is: Me1: 4-36%, Me2: 4-36%, B: 15-60%, and N: 10-65%; and the Me-B-N coating comprises Me1Nx phase, Me2Nx phase and BN phase.

In a class of this embodiment, the Me-B-N coating has a thickness of 0.3-5 μm.

The following advantages are associated with the cutting tool of the disclosure: the cutting tool comprises a Me-B-N coating, so that the tool coating has the characteristics of high hardness, low internal stress, low friction coefficient and high bonding strength with a tool substrate, which not only makes the coated cutting tool show obvious anti bonding performance in the process of cutting titanium alloy or superalloy, but also can effectively inhibit the bonding wear and damage of the tool in the process of cutting titanium alloy or superalloy.

In another aspect, the disclosure provides a method for preparing the cutting tool, the method comprising:

introducing pure $N_2$ and Ar into a chamber comprising a heater and a substrate, keeping a temperature of the heater constant, applying a back bias voltage on the substrate, and forming a Me-B-N coating on the substrate by magnetron sputtering technology;

a flow ratio of the pure $N_2$ to Ar is 0.06-0.25; a pressure in the chamber is 0.4-4 pascal; and the temperature of the heater in the chamber is in a range of 300-600° C.;

a Me-B target is adopted, and a planet carrier supporting the substrate is connected to a negative pole of a power supply; a rotating speed of the planet carrier is 3 rpm, the back bias voltage is −50 to −300 V, and a time for coating is 60-300 min.

In a class of this embodiment, prior to forming Me-B-N coating, the method further comprises:

ultrasonically cleaning the substrate in anhydrous ethanol, drying the substrate with hot air and clamping on the planet carrier, and placing into the chamber;

pumping the chamber by a mechanical pump and a molecular pump, heating the chamber by an infrared tube heater, to remove volatile impurities from the chamber and the substrate;

introducing Ar into the chamber, keeping the temperature of the heater constant, applying a back bias voltage on the substrate, performing ion etching on the substrate, to remove an oxide scale and a loose layer from the surface of the substrate.

In a class of this embodiment, the substrate is ultrasonically cleaned in the anhydrous ethanol for 10-20 min.

In a class of this embodiment, the chamber is pumped to below $4 \times 10^{-5}$ mbar by the mechanical pump and the molecular pump for a first time, heated by the infrared tube heater at 600° C. for 30 minutes, pumped to below $4 \times 10^{-5}$ mbar for a second time, heated by the infrared tube heater at 550° C. for 30 minutes, and pumped to below $4 \times 10^{-5}$ mbar for a third time, so that the volatile impurities are removed from the chamber and the surface of the substrate.

In a class of this embodiment, during ion etching, the temperature of the infrared tube heater is in a range of 300-600° C., the pressure of the chamber is 1.0 pascal, a Cr target is used as a round cathodic arc with a purity more than 99%; and a target current of 70-100 A is applied to the round cathodic arc.

In a class of this embodiment, during ion etching, the planet carrier is connected to a two-stage power supply and rotates at a speed of 3 rpm, the back bias voltage is −300V, a positive voltage is +20V, a frequency is 20 kHz, and a duty cycle is 80%; and the substrate is etched for 20-40 minutes.

In a class of this embodiment, the method further comprises cooling the coated cutting tool with a cooling water circulation system in vacuum before the coated cutting tool is taken out of the chamber.

In a class of this embodiment, a temperature of cooling water of the cooling water circulation system is 15-20° C., and the chamber is cooled to less than 70° C. in vacuum.

The following advantages are associated with the method of the disclosure: during Me-B-N coating formation process, the Me-B-N coating is formed by magnetron sputtering on a planar Me-B-N target; the flow rate ratio of pure $N_2$ to pure Ar is regulated precisely; the average power density of the sputtering target is 5.5-16.5 $W/cm^2$, and the duty cycle is 2%-5%; so that the Me-B-N coating shows obvious anti-bonding performance and uniformity, low internal stress, low friction coefficient and high bonding strength with a tool substrate, thus increasing the service life of the cutting tool.

DETAILED DESCRIPTION OF THE DRAWINGS

Figure 2:
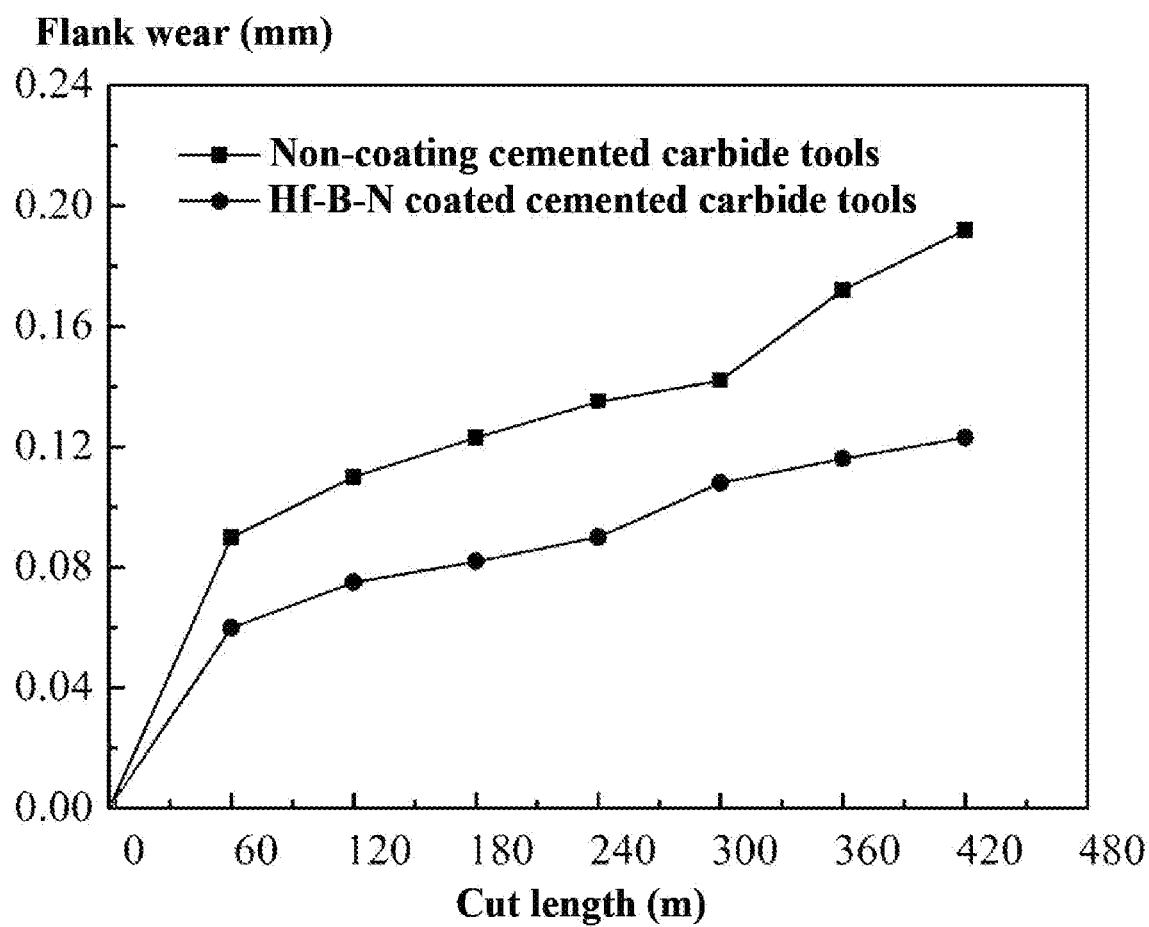

FIG. 1 is a scanning electron microscope (SEM) image of a V-B-N coating according to Example 1 of the disclosure; and FIG. 2 is a comparison graph of wear degree of faces of a cutting tool comprising a Hf-B-N coating and a cemented carbide blade according to Example 2 of the disclosure.

DETAILED DESCRIPTION

To further illustrate the disclosure, embodiments detailing a coated cutting tool are described below. It should be noted that the following embodiments are intended to describe and not to limit the disclosure.

EXAMPLE 1

A cutting tool for machining titanium and superalloy comprises a V-B-N coating; the atomic percentage of each element is: V: 15%, B: 20%, and N: 65%; and the V-B-N coating comprises VN phase and BN phase.

Optionally, the V-B-N coating has a thickness of 0.3 μm.

A method for manufacturing the cutting tool, comprises:
1. Substrate pretreatment: the substrate is ultrasonically cleaned in anhydrous ethanol for 10 minutes, dried with hot air, clamped on a planet carrier, and placed into a chamber;
2. Chamber evacuation: the chamber is pumped to below $4\times10^{-5}$ mbar by a mechanical pump and molecular pump, heated by an infrared tube heater at 600° C. for 30 minutes, pumped to below $4\times10^{-5}$ mbar again, heated by the infrared tube heater at 550° C. for 30 minutes, and pumped to below $4\times10^{-5}$ mbar again, so that volatile impurities are removed from the chamber and the surface of the substrate; and
3. Ion etching: before V-B-N coating formation, the substrate comprising cemented carbide is etched with an arc-enhanced glow discharge process. The specific process is detailed as follows: (1) a round cathodic arc is used as a Cr sputtering target with a purity more than 99%; and a target current of 70 A is applied to the round cathodic arc; (2) the planet carrier is connected to a two-stage power supply and rotates at a speed of 3 rpm, a back bias voltage is increased from −50V to −300V, a positive voltage is +20V, a frequency is 20 kHz, and a duty cycle of 80%; (3) pure Ar is introduced into the vacuum chamber; a pressure in the chamber is 1.0 pascal; and a flow rate of pure Ar is regulated by gas pressure; (4) the temperature of the infrared tube heater is 300° C.; (5) and the substrate is etched for 20 minutes; so that an oxide scale and a loose coating are removed from the surface of the substrate.
4. Formation of V-B-N coating: pure $N_2$ and Ar are introduced into the chamber and the infrared tube heater is kept at a constant temperature; a back bias voltage is applied to the substrate; and a V-B-N coating is formed on the substrate by high power impulse magnetron sputtering. A flow rate of pure $N_2$ is 10 sccm; a flow rate ratio of pure $N_2$ to pure Ar is 0.06; the chamber pressure is 0.8 pascal; the temperature of the infrared tube heater is 600° C.; the back bias voltage is applied to the substrate; and the V-B-N coating is formed on the substrate by high power impulse magnetron sputtering. The specific process is detailed as follows: (1) a plane V-B target is used as a sputtering target; (2) the planet carrier is connected to a negative pole of the two-stage power supply and rotates at a speed of 3 rpm; and the back bias voltage is −300V; (3) the V-B-N coating formation process takes 60 minutes.
5. Sample cooling: a cooling water circulation system is turned on; the temperature of the cooling water of the cooling water circulation system is 15° C.; and the vacuum chamber is cooled with the cooling water to less than 70° C. before the coated cutting tool is taken out of the chamber.

FIG. 1 is an SEM image of a V-B-N coating of the disclosure. The results show that the surface of the V-B-N coating is smooth and flat without formation of droplet or voids.

EXAMPLE 2

A cutting tool for machining titanium alloys and superalloy comprises a Hf-B-N coating; the atomic percentage of each element is: Hf: 55%, B: 15%, and N: 30%; and the Hf-B-N coating comprises HfN phase and BN phase.

Optionally, the Hf-B-N coating has a thickness of 5 μm.

A method for manufacturing the cutting tool, comprises:
1. Substrate pretreatment: the substrate is ultrasonically cleaned in anhydrous ethanol for 20 minutes, dried with hot air, clamped on a planet carrier, and placed into a chamber;
2. Chamber evacuation: the chamber is pumped to below $4\times10^{-5}$ mbar by a mechanical pump and molecular pump, heated by an infrared tube heater at 600° C. for 30 minutes, pumped to below $4\times10^{-5}$ mbar again, heated by the infrared tube heater at 550° C. for 30 minutes, and pumped to below $4\times10^{-5}$ mbar again; so that the volatile impurities are removed from the chamber and the surface of the substrate; and
3. Ion etching: before Hf-B-N coating formation, the substrate comprising cemented carbide is etched with an arc-enhanced glow discharge process. The specific process is detailed as follows: (1) a round cathodic arc is used as a Cr sputtering target with a purity more than 99%; and a target current of 90 A is applied to the round cathodic arc; (2) the planet carrier is connected to a two-stage power supply and rotates at a speed of 3 rpm, a back bias voltage is increased from −50V to −300V, a positive voltage is +20V, a frequency is 20 kHz, and a duty cycle is 80%; (3) pure Ar is introduced into the vacuum chamber; a pressure in the chamber is 1.0 pascal; and a flow rate of pure Ar is regulated by gas pressure; (4) the temperature of the infrared tube heater is 600° C.; (5) and the substrate is etched for 40 minutes; so that an oxide scale and a loose coating are removed from the surface of the substrate.
4. Formation of Hf-B-N coating: pure $N_2$ and Ar are introduced into the chamber and the infrared tube heater is kept at a constant temperature; a back bias voltage is applied to the substrate; and the Hf-B-N coating is formed on the substrate by high power impulse magnetron sputtering. A flow rate of pure $N_2$ is 10 sccm; a flow rate ratio of pure $N_2$ to pure Ar is 0.25; the chamber pressure is 0.4 pascal; the temperature of the infrared tube heater is 300° C.; the back bias voltage is applied to the substrate; and the Hf-B-N coating is formed on the substrate by high power impulse magnetron sputtering. The specific process is detailed as follows: (1) a plane Hf-B target is used as a sputtering target with a power density of 16.5 W/cm$^2$; (2) the planet carrier is connected to a negative pole of the two-stage power supply and rotates at a speed of 3 rpm; and the back bias voltage is −50V; (3) the Hf-B-N coating formation process takes 300 minutes;

5. Sample cooling: a cooling water circulation system is turned on; the temperature of the cooling water of the cooling water circulation system is 20° C.; and the vacuum chamber is cooled with the cooling water to less than 70° C. before the coated cutting tool is taken out of the chamber.

A turning cutting test is carried out at a cutting speed of 90 m/min, a cutting depth is 1.0 mm, and a feed rate is 0.25 mm/r; oil-water composite is used to spray for cooling. As shown in FIG. 2, the cutting tool with the Hf-B-N coating shows obvious anti-wear property to a flank face and anti-bonding performance in the process of cutting titanium alloy or superalloy, as compared to a cemented carbide blade without Hf-B-N coating.

EXAMPLE 3

A cutting tool for machining titanium and superalloy comprises a Hf-Ti-B-N coating; the atomic percentage of each element is: Hf: 20%, Ti: 15%, B: 30%, and N: 35%; and the Hf-Ti-B-N coating comprises FUN phase, TiN phase, and BN phase.

Optionally, the Hf-Ti-B-N coating has a thickness of 2.75 μm.

A method for manufacturing the cutting tool, comprises:
1. Substrate pretreatment: the substrate is ultrasonically cleaned in anhydrous ethanol for 15 minutes, dried with hot air, clamped on a planet carrier, and placed into a chamber;
2. Chamber evacuation: the chamber is pumped to below 4×10$^{-5}$ mbar by a mechanical pump and molecular pump, heated by an infrared tube heater at 600° C. for 30 minutes, pumped to below 4×10$^{-5}$ mbar again, heated by the infrared tube heater at 550° C. for 30 minutes, and pumped to below 4×10$^{-5}$ mbar again; so that the volatile impurities are removed from the chamber and the surface of the substrate; and
3. Ion etching: before Hf-Ti-B-N coating formation, the substrate comprising cemented carbide is etched with an arc-enhanced glow discharge process. The specific process is detailed as follows: (1) a round cathodic arc is used as a Cr sputtering target with a purity more than 99%; and a target current of 80 A is applied to the round cathodic arc; (2) the planet carrier is connected to a two-stage power supply and rotates at a speed of 3 rpm, a back bias voltage is increased from −50V to −300V, a positive voltage is +20V, a frequency is 20 kHz, and a duty cycle is 80%; (3) pure Ar is introduced into the vacuum chamber; a pressure in the chamber is 1.0 pascal; and a flow rate of pure Ar is regulated by gas pressure; (4) the temperature of the infrared tube heater is 450° C.; (5) and the substrate is etched for 30 minutes; so that an oxide scale and a loose coating are removed from the surface of the substrate.
4. Formation of Hf-Ti-B-N coating: pure N$_2$ and Ar are introduced into the chamber and the infrared tube heater is kept at a constant temperature; a back bias voltage is applied to the substrate; and the Hf-Ti-B-N coating is formed on the substrate by high power impulse magnetron sputtering. A flow rate of pure N$_2$ is 20 sccm; a flow rate ratio of pure N$_2$ to pure Ar is 0.14; the chamber pressure is 0.6 pascal; the temperature of the infrared tube heater is 450° C.; the back bias voltage is applied to the substrate; and the Hf-Ti-B-N coating is formed on the substrate by high power impulse magnetron sputtering. The specific process is detailed as follows: (1) a plane Hf-B target and a Ti-B target are used as sputtering targets; (2) the planet carrier is connected to the negative pole of the two-stage power supply and rotates at a speed of 3 rpm; and the back bias voltage is −175 V; (3) the Hf-Ti-B-N coating formation process takes 180 minutes;
5. Sample cooling: a cooling water circulation system is turned on; the temperature of the cooling water of the cooling water circulation system is 18° C.; and the vacuum chamber is cooled with the cooling water to less than 70° C. before the coated cutting tool is taken out of the chamber.

A mill test is carried out at a cutting speed of 100 m/min, a cutting depth is 3.0 mm, a cutting width is 0.5 mm, and a feed rate is 0.2 mm/r. A conventional coolant is used to spray for cooling. The results show that as compared to a conventional blade with a coating, the cutting tool comprising the Hf-Ti-B-N coating shows obvious anti-wear property and anti-bonding performance in the process of cutting titanium alloy or superalloy, thus having a service life 2 times that of the conventional blade.

The following advantages are associated with the coated cutting tool of the disclosure; The cutting tool comprises a Me-B-N coating, so that the tool coating has the characteristics of high hardness, low internal stress, low friction coefficient and high bonding strength with a tool substrate, which not only makes the coated cutting tool show obvious anti bonding performance in the process of cutting titanium alloy or superalloy, but also can effectively inhibit the bonding wear and damage of the tool in the process of cutting titanium alloy or superalloy.

During Me-B-N coating formation process, the Me-B-N coating is formed by magnetron sputtering on a plane Me-B-N target; a flow rate ratio of pure N$_2$ to pure Ar is regulated precisely; an average power density of the sputtering target is 5.5-1.6.5 W/cm$^2$, and the duty cycle is 2%-5%; so that the Me-B-N coating shows obvious anti-bonding performance and uniformity, low internal stress, low friction coefficient and high bonding strength with a tool substrate, thus increasing the service life of the cutting tool.

It will be obvious to those skilled in the art that changes and modifications may be made, and therefore, the aim in the appended claims is to cover all such changes and modifications.

What is claimed is:

1. A cutting tool for machining titanium alloy or superalloy, comprising a Me-B-N coating, wherein Me is one or more elements selected from the transition metals V, Nb, Ta, and Mo; the atomic percentages of each element are as follows: Me: 8-40% B: 15-60%, and N: 10-65%; and the Me—B—N coating comprises a MeNx phase and a BN phase.

2. The cutting tool of claim 1 wherein the Me-B-N coating has a thickness of 0.3-5 μm.

* * * * *